US009185215B2

(12) United States Patent  
Madhavapeddi et al.

(10) Patent No.: US 9,185,215 B2  
(45) Date of Patent: Nov. 10, 2015

(54) PERFORMING ACTIONS FOR USERS BASED ON SPOKEN INFORMATION

(71) Applicant: Nuance Communications, Inc., Burlington, MA (US)

(72) Inventors: Shreedhar Madhavapeddi, Seattle, WA (US); John F. Pollard, Seattle, WA (US)

(73) Assignee: Nuance Communications, Inc., Burlington, MA (US)

( * ) Notice: Subject to any disclaimer, the term of this patent is extended or adjusted under 35 U.S.C. 154(b) by 0 days.

(21) Appl. No.: 14/271,320

(22) Filed: May 6, 2014

(65) Prior Publication Data

US 2014/0241514 A1  Aug. 28, 2014

Related U.S. Application Data

(63) Continuation of application No. 13/596,427, filed on Aug. 28, 2012, now Pat. No. 8,718,239, which is a continuation of application No. 11/940,229, filed on Nov. 14, 2007, now Pat. No. 8,254,535.

(60) Provisional application No. 60/859,052, filed on Nov. 14, 2006, provisional application No. 60/859,049, filed on Nov. 14, 2006.

(51) Int. Cl.
*H04M 11/00* (2006.01)
*H04M 3/493* (2006.01)
*H04M 1/64* (2006.01)

(52) U.S. Cl.
CPC .............. *H04M 3/493* (2013.01); *H04M 1/64* (2013.01)

(58) Field of Classification Search
CPC combination set(s) only.
See application file for complete search history.

(56) References Cited

U.S. PATENT DOCUMENTS

| 6,571,279 B1 | 5/2003 | Herz et al. |
| 6,671,353 B1 | 12/2003 | Goh |
| 6,868,384 B2 | 3/2005 | Parus et al. |

(Continued)

OTHER PUBLICATIONS

"Interactive Voice Response," retrieved on Nov. 12, 2007, from http://en.wikipedia.org/wiki/Ivr, 3 pages.

(Continued)

*Primary Examiner* — Joseph T Phan
(74) *Attorney, Agent, or Firm* — Perkins Coie LLP

(57) ABSTRACT

Techniques are described for performing actions for users based at least in part on spoken information, such as spoken voice-based information received from the users during telephone calls. The described techniques include categorizing spoken information obtained from a user in one or more ways, and performing actions on behalf of the user related to the categorized information. For example, in some situations, spoken information obtained from a user is analyzed to identify one or more spoken information items (e.g., words, phrases, sentences, etc.) supplied by the user, and to generate corresponding textual representations (e.g., via automated speech-to-text techniques). One or more actions may then be taken regarding the identified information items, including to categorize the items by adding textual representations of the spoken information items to one or more of multiple predefined lists or other collections of information that are specific to or otherwise available to the user.

20 Claims, 9 Drawing Sheets

Sequence of events in Explicit Categorization using Keywords

(56) References Cited

U.S. PATENT DOCUMENTS

| | | |
|---|---|---|
| 7,596,269 B2 | 9/2009 | King et al. |
| 7,620,549 B2 | 11/2009 | Di Cristo et al. |
| 7,970,608 B2 | 6/2011 | Madhavapeddi et al. |
| 8,032,537 B2 | 10/2011 | Consul et al. |
| 8,086,464 B2 | 12/2011 | Cosatto et al. |
| 8,254,535 B1 | 8/2012 | Madhavapeddi et al. |
| 8,345,832 B2 | 1/2013 | Hamaker et al. |
| 8,484,098 B2 * | 7/2013 | Bilotta ................ 705/26.7 |
| 8,503,925 B2 * | 8/2013 | Chapin ................ 455/3.01 |
| 8,566,306 B2 | 10/2013 | Jones |
| 8,612,356 B2 * | 12/2013 | Hutchinson et al. ............ 705/64 |
| 8,644,463 B2 | 2/2014 | Demmitt et al. |
| 9,020,107 B2 * | 4/2015 | Madhavapeddi et al. .. 379/88.18 |
| 2005/0015256 A1 | 1/2005 | Kargman |
| 2005/0107071 A1 | 5/2005 | Benco et al. |
| 2006/0171520 A1 | 8/2006 | Kliger |
| 2007/0078708 A1 | 4/2007 | Yu et al. |
| 2007/0116227 A1 | 5/2007 | Vitenson et al. |
| 2011/0145057 A1 | 6/2011 | Jones et al. |
| 2012/0022950 A1 | 1/2012 | Gilbert et al. |
| 2013/0117267 A1 | 5/2013 | Buryak et al. |

OTHER PUBLICATIONS

"Nuance—Dragon Naturally Speaking Preferred 9," retrieved on Nov. 12, 2007, from http://www.digitalriver.com/v2.0-img/operations/scansoft/site/html/dragon- /Preferred.sub.--9.htm, 2 pages.

Nuance—Dragon Naturally Speaking Preferred 9—Key Features, retrieved on Nov. 12, 2007, from http://www.digitalriver.com/v2.0-img/operations/scansoft/site/html/dragon-/Preferred.sub.--9.sub.--features . . . , 2 pages.

"Speech recognition," retrieved on Nov. 12, 2007, from http://en.wikipedia.org/wiki/Speech.sub.--recognition, 5 pages.

"Tellme," retrieved on Nov. 12, 2007, from http://www.tellme.com/products/TellmeByVoice, 1 page.

"Tellme—What's New," retrieved on Nov. 12, 2007, from http://www.tellme.com/products/WhatsNew, 1 page.

"Tellme—Voice Tips," retrieved on Nov. 12, 2007, from http://www.tellme.com/products/TellmeByVoice/TellmeTips, 1 page.

"Tellme—FAQs," retrieved on Nov. 12, 2007, from http://www.tellme.com/products/TellmeByVoice/faqs, 1 page.

"Tellme—Tellme for Enterprises," retrieved on Nov. 12, 2007, from http://www.tellme.com/platform, 1 page.

* cited by examiner

Sequence of events in Explicit Categorization using Keywords

Sequence of events in Explicit Categorization based on phone numbers

Sequence of events in Implicit Categorization using Human or Artificial Intelligence

PERFORMING ACTIONS FOR USERS BASED ON SPOKEN INFORMATION

CROSS REFERENCE TO RELATED APPLICATIONS

This application is a continuation of U.S. patent application Ser. No. 13/596,427, now U.S. Pat. No. 8,718,239, filed Aug. 28, 2012 and entitled "Performing Actions For Users Based on Spoken Information," which is a continuation of U.S. patent application Ser. No. 11/940,229, now U.S. Pat. No. 8,254,535, filed Nov. 14, 2007 and entitled "Performing Actions For Users Based on Spoken Information," which claims the benefit of provisional U.S. Patent Application No. 60/859,052, filed Nov. 14, 2006 and entitled "Categorization And Corresponding Actions On Voice Messages, System And Method;" and of provisional U.S. Patent Application No. 60/859,049, filed Nov. 14, 2006 and entitled "Voice Driven Presence For IM Networks And Multimodal Communications Across Messaging Networks;" each of which is hereby incorporated by reference in its entirety.

TECHNICAL FIELD

The following disclosure relates generally to techniques for performing actions for users based on spoken information, such as to automatically categorize spoken information items provided by a user of a voice-based messaging system according to multiple available collections of information for the user, and to perform one or more types of actions for the categorized information items for the collections of information.

BACKGROUND

While people are increasingly using data retrieval capabilities of computing devices to access information of a variety of types, voice-based functionality of telephones continues to be commonly used for a variety of purposes, including to obtain information of various types. For example, telephones are frequently used to obtain address and telephone number information for designated individuals or businesses, such as via automated and/or manual directory assistance services. In addition, enhanced directory assistance services exist to provide a variety of types of additional information to telephone users, such as movie listings, weather reports, sports scores, traffic reports, etc. Moreover, some businesses may provide automated telephone systems to provide various information to customers and/or partners about their businesses, such as via Interactive Voice Response ("IVR") systems. Other types of systems may similarly provide a variety of other types of functionality to voice-based telephone users, such as voice message recording and/or forwarding services (e.g., to record a voice message to later be provided to one or more designated recipients), transcription services (e.g., to record voice-based information that will later be manually and/or automatically converted into text), etc. While various services and systems thus exist for telephone users to obtain some types of voice-based information, it is nonetheless often difficult for telephone users to obtain a variety of other types of functionality.

In addition, it is often difficult for companies and other entities to effectively provide promotional and other types of information to others and/or to provide information to others about products and/or services that are available. For example, while a variety of types of advertising models are known (e.g., via traditional print media; radio; television; billboards; Internet-based banner ads and sponsored links and pop-up ads; location-based services, such as via data services of mobile devices; etc.), all suffer from various known problems, including difficulties in providing information to users that is currently of interest and in a form and/or manner that is desired.

DETAILED DESCRIPTION

Figure 1:
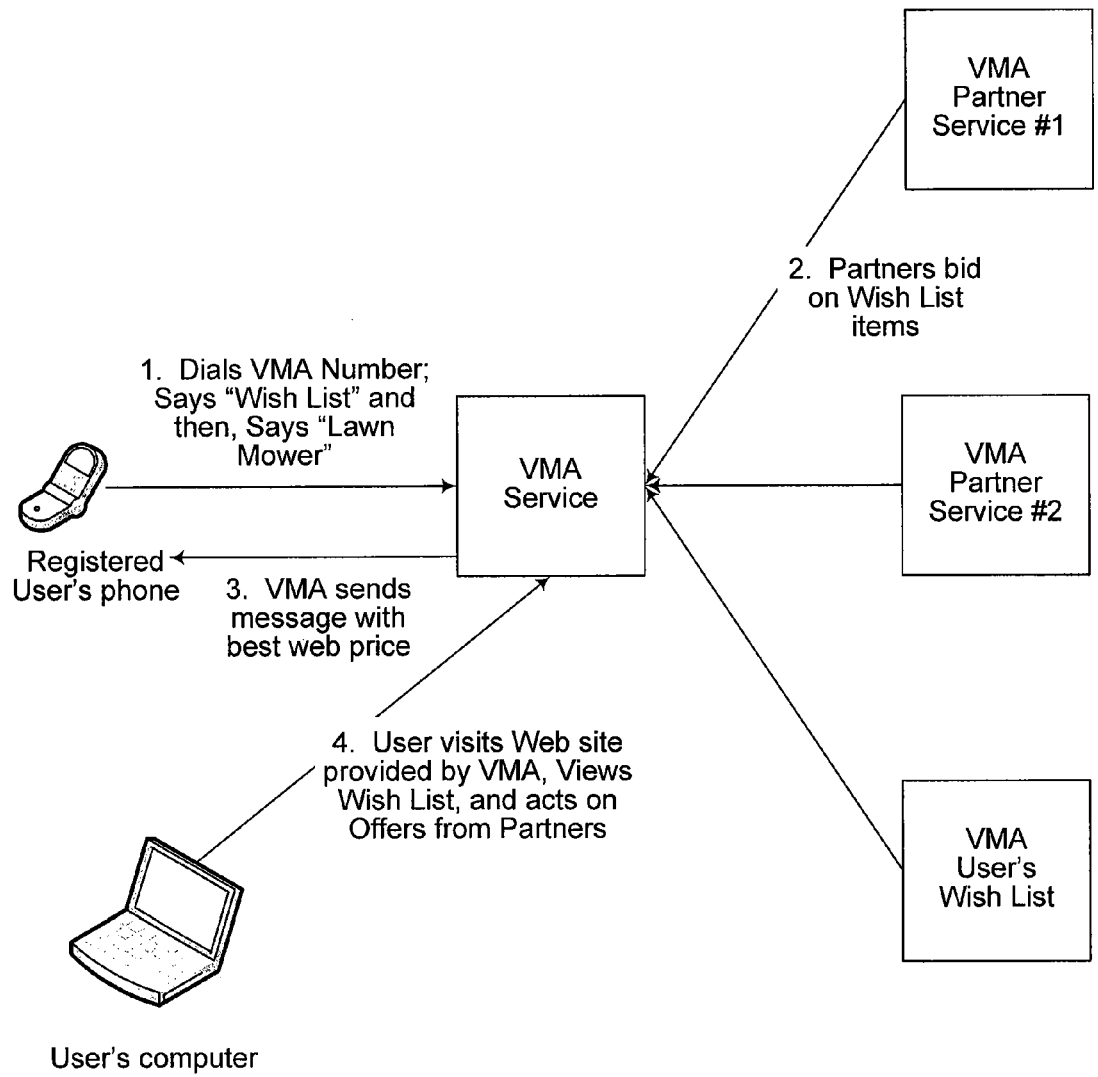
FIGS. 1-4 illustrate examples of some types of interactions to perform actions for users based on spoken information.

Techniques are described for performing actions for users based at least in part on spoken information, such as spoken voice-based information received from the users during telephone calls. In at least some embodiments, the described techniques include categorizing spoken information obtained from a user in one or more ways, and performing actions on behalf of the user related to the categorized information. For example, in at least some embodiments, spoken information obtained from a user is analyzed to identify one or more spoken information items (e.g., words, phrases, sentences, etc.) supplied by the user, and in at least some situations to further generate textual representations of the identified information items (e.g., based on use of automated speech-to-text techniques). One or more actions may then be taken regarding the identified information items, such as to add textual representations of the identified information items to one or more of multiple predefined lists or other collections of information that are specific to or otherwise available to the user (e.g., based on an indication of that information collection supplied by the user as part of the spoken information that includes the identified information items), to use textual representations of the identified information items to generate other information (e.g., to perform a search based on the textual representations), to provide to the user various types of automatically determined information based on the information items, etc. Additional details are included below related to performing actions for users based at least in part on spoken information. In addition, in at least some embodiments, a Voice Message Activity ("VMA") system automatically performs some or all of the described techniques, such as by providing a VMA service to remote users, as described in greater detail below.

In at least some embodiments, the VMA system allows numerous remote users to each maintain one or more lists, groups, or other collections of information at the VMA system, such that a user may place a telephone call to the VMA system to supply one or more spoken information items to be added to a particular list or other information collection. Such lists or other information collections may have various forms in various embodiments, as discussed in greater detail below, such as, for example, a shopping list, a reminder list related to a particular topic, a wish list of desired items, etc. Thus, as one specific example, a user may supply a voice message during a telephone call that includes a spoken indication of "shopping list" and of one or more information items (e.g., "milk", "a dozen eggs", etc.) to be added to that user's shopping list, such that a stored copy of a shopping list for that user will be updated to include textual representations of "milk" and "a dozen eggs" (e.g., in addition to information items added to the shopping list during one or more prior telephone calls). In at least some embodiments, the VMA system may provide one or more predefined types of lists or other information collections for selection by users, such that each user may create and maintain a separate copy of a particular type of information collection (e.g., a separate shopping list), although in other embodiments at least some types of information collections may be configured to be shared between multiple users. Furthermore, in at least some embodiments, the VMA system may allow at least some users to define one or more new information collections specific to that user (e.g., for user Bob to define an information collection of Bob's list of interesting facts to tell Betty). A user may gain access to information stored in one or more information collections by the VMA system (e.g., in a database) and/or to functionality from the VMA system related to stored information for one or more such information collections in various ways in various embodiments, as discussed in greater detail below.

As previously noted, spoken information may be obtained from users in various ways in various embodiments. For example, a user may place a telephone call to an IVR system or other automated voice-based system, such as via one or more of the following: a cell phone; a landline phone; a satellite phone; a phone that uses one or more computer networks at least in part, such as for a Voice Over IP ("VOIP") call; a phone whose connection uses a URL ("Uniform Resource Locator") or other URI ("Uniform Resource Identifier"), such as based on an SIP ("Session Initiation Protocol") URI "phone number" (e.g., sip:<username>@<host>:port, where <username> is replaced by an actual username and <host> is replaced by a domain name or IP address, such as john.smith@212.111.1.111 or support@abcdefgh.com), as described in greater detail in the RFC 3261 standard); etc., such as to provide spoken information that includes instructions and/or other information related to one or more actions to be taken. Once spoken information is obtained from a user, it may then be analyzed in various ways in various embodiments, including in an automated manner and/or based at least in part by one or more human operators of the VMA system. For example, when a user includes one or more spoken information items, the VMA system may analyze the spoken information in order to categorize that information, such as to determine a list or other information collection on which the information items are to be included (e.g., based on a spoken indication of the information collection, or instead in another manner), or instead to determine one or more other types of actions to take for those spoken information items. In some embodiments, the spoken information from a user is analyzed in a realtime or substantially realtime manner during a telephone call with the user, such as to allow appropriate responses to be provided to the user during the telephone call. In other embodiments, the analysis of spoken information may occur after a telephone call from a user is completed (e.g., by analyzing a voice message left by the user), such as if results or other corresponding information and/or functionality are provided to the user at a later time.

Various types of actions may be performed for users based on spoken information received from the user, and may be determined in various ways in various embodiments. For example, one or more actions to take regarding one or more spoken information items supplied by a user may be determined in at least some embodiments based at least in part on one or more of the following: spoken instructions or other information that is supplied by a user along with the spoken information items (e.g., supplied as part of the spoken information provided by the user during a telephone call); previously supplied instructions or other information (whether spoken or supplied in another manner); later-supplied instructions or other information whether spoken or supplied in another manner); a manner of supplying the information items (e.g., based on a particular telephone number that is called to provide the spoken information); a type of the information items (e.g., to automatically determine to add items corresponding to food to a user's shopping list rather than a list of to-do items to later be performed); etc. As one specific example, if a user provides spoken information that indicates a particular list or other information collection and one or more information items, the actions to be taken may include adding textual representations (and/or other representations, such as audio representations) of those information items to that information collection. A non-exclusive list of other types of actions may include, for example, one or more of the following: performing a search based on one or more information items (e.g., by using one or more of the information items as keywords for the search and/or by using one or more of the information items to indicate a particular search engine to use or other manner of performing the search); sending indicated information to an indicated recipient; adding information to an information collection that is available to multiple users (e.g., a bulletin board); etc. Furthermore, in at least some embodiments, spoken information from a user may indicate various other types of actions to take related to maintenance of particular lists or other information collections, such as to create or delete particular information collections, to remove or otherwise modify information items that are already present in one or more information collections, etc.

In addition, in some embodiments, one or more actions to take regarding one or more information items supplied by a user may include providing information to the user about those items. For example, in at least some embodiments, an action for one or more supplied information items and/or for the information items that are currently part of an indicated information collection may include providing information about those information items to the user and/or another recipient. In particular, after one or more spoken information items are supplied by a user and added to a collection, textual representations of those information items may be made available to the user (e.g., in response to a request from the user, by automatically sending one or more electronic messages to the user whose contents include those textual representations, etc.). In other situations, information that is provided to a user may be otherwise based on one or more supplied information items, such as to provide search results that are generated based on using one or more supplied information items. Information may be provided to a user in various ways, such as via one or more electronic messages sent to the user (e.g., via one or more emails, instant messages, paging messages, SMS or other text messages, etc., such as based on previously specified electronic address information for a user who registered with the VMA system), via a response to an interactive query from the user (e.g., as part of one or more Web pages requested by the user when interacting with the VMA system, such as a request for the contents of one or more information collections of the user), and/or via a spoken voice-based response (e.g., immediately, such as during a telephone call with the user and in response to a spoken request or other spoken information from the user). Furthermore, in at least some embodiments, a user may be able to access and modify stored information in one or more information collections from prior spoken information in one or more manners, including interactively by a remote user of a computing device or system that interacts with the VMA system, programmatically via an API of the VMA system, via a telephone-based interface (e.g., via spoken commands or other instructions), etc.

In addition, in some embodiments, one or more actions to take regarding one or more information items supplied by a user may include actions related to a communication system (e.g., an instant messaging network system provided by the VMA system or a third-party system). For example, based on spoken information provided by a user, the VMA system may perform actions such as signing the user into an instant messenger network, and setting presence of the user on the instant messenger network (e.g., indicating that the user is online and/or in a particular location or performing a particular activity), as well as optionally performing other operations related to instant messaging based on spoken information provided by a user. As one specific example, a user may provide a voice message during a telephone call to the VMA system that includes an indication that the user wants to sign into an instant messenger system (e.g., by saying "Log in to IM"), and the VMA system will log the user into an instant messenger system. Other types of actions by the VMA system may include logging a user off (e.g., by saying "Log off IM"), setting status of a user (e.g., by saying "Set status to . . . "), providing contents of one or more IM communications to the user (e.g., by using text-to-speech to automatically convert contents of an IM communication to spoken form, and reciting the spoken contents to the user during a telephone call), sending one or more IM communications to one or more indicated recipients (e.g., by using speech-to-text to automatically convert spoken information items from the user during a telephone call to be textual contents of an IM communication and/or to be indications of particular recipients, and sending the textual contents to the recipients in one or more IM communications), etc. Additional details related to actions concerning receiving and/or providing communications to others, and/or to other interactions with one or more external messaging networks or other communication systems, are included in provisional U.S. Patent Application No. 60/859,049, filed Nov. 14, 2006 and entitled "Voice Driven Presence For IM Networks And Multimodal Communications Across Messaging Networks," which is hereby incorporated by reference in its entirety.

Furthermore, in at least some embodiments, third-parties may obtain various types of information from the VMA system and/or provide various information to users via the VMA system, such as advertisements or other promotional materials (e.g., coupons, discount or promotional codes, samples, etc.) from businesses and other entities (e.g., providers of products, such as manufacturers, distributors, retailers, etc.). For example, if a user has a shopping list or a wish list of desired items, retailers may in some embodiments be able to obtain information about at least some information items on at least some such lists, and to provide related information to the user (e.g., an offer to supply a particular item at a particular price, promotional information specific to the item, information about other related items, etc.). In particular, in some embodiments, the VMA system may provide an API ("application programming interface") to allow such third-party entities to obtain and/or provide such information, such as via one or more Web services provided by the VMA system. Entities who wish to obtain information from and/or provide information to users may further be charged various fees in various situations, such as a flat fee, or a fee for each time that information is obtained from and/or provided to a user (e.g., by allowing an entity to bid on or otherwise specify a price for a target expression, which the entity then pays each time that the information is provided to a user who uses the target expression).

In some embodiments, the VMA system may operate in conjunction with one or more affiliated systems that provide one or more other types of voice-based functionality to users (e.g., with third-party systems in exchange for a fee), while in other embodiments the VMA system may itself provide one or more other types of voice-based functionality to users. A non-exclusive list of other types of voice-based functionality that may be provided in at least some embodiments to users, such as via a telephone call initiated by a user, include the following: the ability to create voice memos or other messages intended for the user and/or one or more other recipients; directory services; the ability to use a phone call to check for coupons and/or in response to advertising in broadcast and/or user-directed media (e.g., radio, television, newspapers, magazines, billboards, online information, etc., whether local or regional/national), etc. In some embodiments, the voice-based functionality may be available only to users who have a predefined relationship with the VMA system and/or an affiliated system, such as registered subscriber or member users who have created an account and provided one or more of various types of information about themselves (e.g., a user name; an actual name; a password; electronic message address information for the user, such as an email address, instant message address, fax number, paging number, and/or telephone number for SMS or other text messages; other contact information; demographic information; information about one or more user phone numbers from which the user will contact the VMA system and/or affiliated system; etc.), as well as in some embodiments paying a fee. In other embodiments, the voice-based functionality may be available to all users. In addition, the VMA system and/or affiliated system may provide one or more telephone numbers that users may call to receive the voice-based functionality, such as toll-free numbers that provide information to the VMA system and/or affiliated system about a calling user's telephone number and/or other caller ID information.

Furthermore, in at least some embodiments, one or more types of information collections may be maintained by one or more third-party systems, but modified or otherwise accessed by the VMA system on behalf of users who provide spoken information to the VMA system. For example, a third-party system may provide a bulletin board system that has one or more bulletin boards that are each accessible to multiple users (e.g., to a specified group of users of the third-party system, to any user of the third-party system, etc.), and one or more of the bulletin boards may be an information collection for each of one or more of the users of the VMA system that are also users of the third-party system. In such situations, a user may provide spoken information to the VMA system during a telephone call or in another manner, and the VMA system may take one or more corresponding actions that include performing a post to a particular such third-party bulletin board on behalf of the user (e.g., to post a textual representation of one or more information items in the spoken information)—in such situations, the VMA system may take various actions on behalf of the user, such as to identify the user to the third-party bulletin board system (e.g., providing a username of the user for the third-party bulletin board system and/or access information such as a password, such as based on information provided by the user during the telephone call or previously in other interactions with the VMA system). Third-party information collections may have other forms in other embodiments, including any Web page or other electronically accessible location in which users are allowed to post comments or otherwise provide information.

The use of the described techniques provides various benefits to users on whose behalf actions are performed based on spoken information, and to entities that obtain information from users and/or make information available to be provided to the users via the VMA system. Non-exclusive examples of some such benefits in at least some embodiments include the following: the ability of users to quickly add information to defined information collections via spoken information provided during telephone calls; the ability of users to access information specified for a defined information collection, such as in a different form than provided (e.g., to obtain a textual representation of information items provided via spoken information) and/or at a different time (e.g., to later obtain indications of spoken information items via email messages or requested Web pages); and the ability of advertisers, marketers, businesses and other entities to target particular information to particular information recipients.

For illustrative purposes, some embodiments are described below in which particular types of information is obtained from users in particular ways (e.g., by obtaining spoken information from users via voice messages supplied by the users during telephone calls) to provide particular types of services and functionality to the users (e.g., to categorize the spoken information, such as to add to an indicated list or other information collection). These examples are provided for illustrative purposes and are simplified for the sake of brevity, and the inventive techniques can be used in a wide variety of other situations, some of which are discussed below. For example, in some embodiments, voice-based information may be obtained from users in other manners than via an automated voice system that the users contact, such as by human operators that received the voice-based information from users and/or in situations in which users are contacted via telephone. In addition, in some embodiments, information that is obtained from a user may be in a form other than voice-based information, such as text-based information, computer-generated audio information, video information, etc., and may similarly be categorized or otherwise analyzed by the VMA system so as to determine one or more actions to perform.

In at least some of the example scenarios described below, voice-based spoken information is obtained from a user, such as from a voice message recorded by a caller user who contacts a VMA system from a mobile phone (e.g., over the mobile network and/or over VOIP), a landline phone, or a desktop/laptop on the Internet. In these example scenarios, spoken information may be categorized using various techniques, including explicit and/or implicit techniques in varying embodiments, so as to determine actions to take for the spoken information. For example, explicit techniques for categorizing spoken information may include providing specific keywords associated with different categories of services and/or functionality that may be spoken by caller users (e.g., such as at the beginning or end of a voice message); providing different telephone numbers associated with different types of services and/or functionality that caller users may call to obtain the associated services and/or functionality; etc. Examples of implicit categorization techniques may include analyzing spoken information to determine an appropriate category based at least in part on the contents of the spoken information, such as by using natural language processing, machine learning techniques, human intelligence, etc.

In addition, various types of actions may be performed on behalf of a caller user based at least in part on the categorized spoken information. For example, actions performed on behalf of a caller user may include one or more of the following: transcribing spoken information and adding at least some of the transcribed information to one or more types of lists (e.g., a grocery list or other shopping list, a wish list, etc.) associated with the caller user and/or with one or more other users, so as to allow the contents of the list to be accessed at a later time (e.g., via a Web-based interface); performing a purchase of one or more indicated products and/or services for a caller user; obtaining price information for one or more indicated products and/or services, such as from an indicated retailer and/or from one or more partner or affiliated users for the VMA system; performing an Internet search for indicated information and providing results to the caller user; transcribing spoken information and publishing at least some of the transcribed information on a Weblog ("blog") or electronic bulletin board system ("BBS"); transcribing spoken information and making the transcribed information available to the caller user in one or more other formats (e.g., in textual form via email, SMS, instant message, etc.); providing access to a communication service (e.g., an instant messaging network), etc.

In addition, in some embodiments, other actions may be performed on behalf of users in conjunction with one or more affiliated partners of the VMA system provider (e.g., third-party vendors, etc.), such as to enhance commerce opportunities for the affiliated partners and/or to provide additional benefits to users. For example, the VMA system may obtain, on behalf of users, price bids for products and/or services offered by various partners, such as by providing information related to categorized information obtained from users to the various partners, and obtaining bids from the various partners for products and/or services provided by those partners that may be related to the information. In some embodiments, user information may be shared with affiliated partners, such as, for example, to allow a user's wish list to be transferred to or otherwise manifested on one or more partner sites (e.g., if the user opts into such a manifestation). In addition, in some embodiments, actions may be performed in conjunction with affiliated partners in a manner that protects the identities of users, such as by withholding users' identities from the various partners (e.g., to maintain user anonymity). For example, anonymous information included in a user's wish list may be provided to non-affiliated partners to obtain bids on product and/or services.

In the example scenario illustrated in FIG. 1, a caller user places a call to an example embodiment of the VMA system that provides a VMA service for use by remote users. In this example, the caller user is a registered VMA system user whose phone number and email address are previously specified to the VMA system, such that the user may be automatically identified by the VMA system (e.g., via use of caller ID or related information that is available about the caller user, via login or other related information explicitly provided by the user, etc.). The caller user dials a general access phone number provided by the VMA system and delivers a voice message by saying a keyword associated with a category of services and/or functionality provided by the system, and then speaking one or more information items (e.g., instructions, content, etc.) associated with that keyword. The VMA system recognizes the keyword and associates the voice message with the appropriate category of services and/or functionality, and performs one or more associated actions using the voice message. In some of the examples provided below, the keyword is associated with a particular list, such that the associated action includes adding information from the voice message to a list and optionally initiating other actions related to the performance of the action (e.g., purchasing goods on behalf of a caller user, etc.).

In particular, in the example scenario of FIG. 1, the registered caller user calls a general number provided by the VMA system. After hearing a welcome prompt, the caller user delivers a voice message that includes saying "Wish List" followed by "Lawn Mower," and then hangs up after hearing a confirmation. The VMA system records the voice message, adds an indication of the "Lawn Mower" information item (e.g., a textual representation of the item) to the caller user's wish list for later access by the user, and also in this example obtains bids from affiliated VMA Partner Service #1 (e.g., an online retailer) and affiliated VMA Partner Service #2 (e.g., an online auction site) for lawn mowers to provide to the user in various ways. The VMA system may then optionally send an SMS message to the caller user's mobile phone (e.g., to the number from which the caller user dialed, or a number known to the VMA system to be an SMS number for the caller user) with some or all of the information (e.g., the best price) obtained from the affiliated partners. The caller user may later access the wish list provided by the VMA system (e.g., via a Web site or other Web-based interface provided by the VMA system) and interact with the wish list in various ways (e.g., view, modify, etc.), including the added indication from the voice message and/or any offers or other information obtained from affiliated partner sites.

Some examples of keywords used by, associated information items stored by, and actions that may be taken by an example embodiment of the VMA system are as follows:

| No. | Keyword | Associated Information | Action(s) Taken |
|---|---|---|---|
| 1 | Groceries | "Milk, Butter, Eggs" | Add associated information to a grocery list maintained by a local grocery store. Groceries may be shipped when certain previously specified criteria for the grocery list are met. |
| 2 | Wish List | "Smallville DVD" | Add associated information to wish list hosted by VMA system. Wish list may also be embedded at affiliated online retailer partner. Lowest price may be obtained and sent to user as SMS message. |
| 3 | Shopping List | "'The World is Flat' by Thomas Friedman" | Add associated information to shopping list hosted by VMA system. Online book retailer partner may be contacted to ship book immediately to user. |
| 4 | Deferred Web Search | "Iceland hot springs" | Add associated information to Web search list. VMA system may send user an SMS and/or an email containing search results, or with a link that may be used by the user's client device to obtain and render a Web page with the search results. |
| 5 | To-Do List | "Schedule Camry 30,000 mile tune up" | Add associated information to user's To-Do list. Optionally provide to the user relevant information related to the associated information added to the list (e.g., discount coupon from a local mechanic). |
| 6 | Blog comments | "Nice pictures, talk soon" | Transcribe associated information and add to an indicated Weblog. |
| 7 | Delegate Work | "Cancel my flight to NYC next week" | Add associated information to a designated delegate's work item list for further action by the delegate. |
| 8 | Gift List | "blender for Geoff's housewarming" | Add associated information to a list of gifts that a user wishes to purchase. Optionally obtain and present bids from partners for gift if appropriate. |
| 9 | Travel Planning List | "buy snorkel gear for trip to Bahamas" | Add associated information to the user's travel planning list for, further action by the user. |

Example number 9, "Travel Planning List," is an example of a custom list that a user may create. In other example embodiments, users may create various other types of customizable lists, such as "Baby Shower List," "Thanksgiving Invitee List," "Holiday Gifts List," etc.

Figure 2:
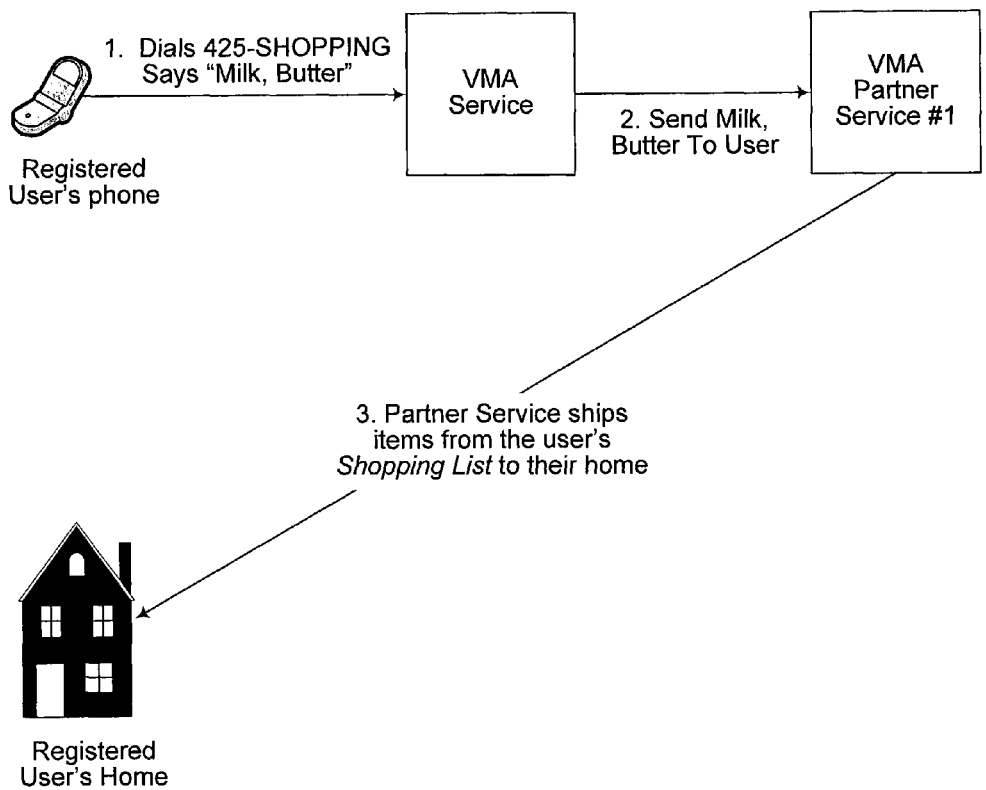

In the example scenario of FIG. 2, a caller user who places a call to an example embodiment of the VMA system is a registered VMA system user, whose phone number and email address are previously specified to the VMA system. In contrast to the use of a general access phone number in the example scenario described with respect to FIG. 1, the caller user in the example scenario of FIG. 2 dials a specific phone number provided by the VMA system for use in accessing a specific category of information and/or functionality (in this example, a specific phone number associated with a particular type of information collection, such as a 425-SHOPPING phone number associated with shopping lists), and then says a voice message associated with that category. The VMA system adds information from the voice message to the specific list associated with the dialed number.

In particular, in the example scenario of FIG. 2, the registered caller user calls a specific Shopping List Number (e.g., 425-SHOPPING), hears a welcome prompt, says "Milk, Butter," and then hangs up after hearing a confirmation. The VMA system records the voice message, adds an indication of the "Milk, Butter" information items (e.g., textual representations of the item) to the user's Shopping List, and also in this example sends the information item indications to the user's preset partner service (e.g., an online grocery service). The partner service may then ship the shopping list items to the user according to a predetermined arrangement by the user (e.g., immediately, as part of the next delivery, etc.).

Some examples of phone numbers provided by, and associated information items stored by an example embodiment of the VMA system are as follows:

| No. | Phone Number | Associated Information |
|---|---|---|
| 1 | 425-GROCERIES | "Milk, Butter, Eggs" |
| 2 | 425-WISH-LIST | "Smallville DVD" |
| 3 | 425-SHOPPING | "'The World is Flat' by Thomas Friedman" |
| 4 | 425-WEB-SEARCH | "Iceland hot springs" |
| 5 | 425-TO-DO-LIST | "Schedule Camry 30,000 mile tune up" |
| 6 | 425-4-WEBLOG | "Nice pictures, talk soon" |
| 7 | 425-DELEGATE | "Cancel my flight to NYC next week" |
| 8 | 425-GIFT-LIST | "blender for Geoff's housewarming" |
| 9 | 425-CUSTOM LIST | "buy snorkel gear for trip to Bahamas" |

Actions may be taken by an example embodiment of the VMA system for particular telephone numbers in a manner similar to that described with respect to the scenario described for FIG. 1, or in other embodiments additional or other actions may be performed.

Figure 3:
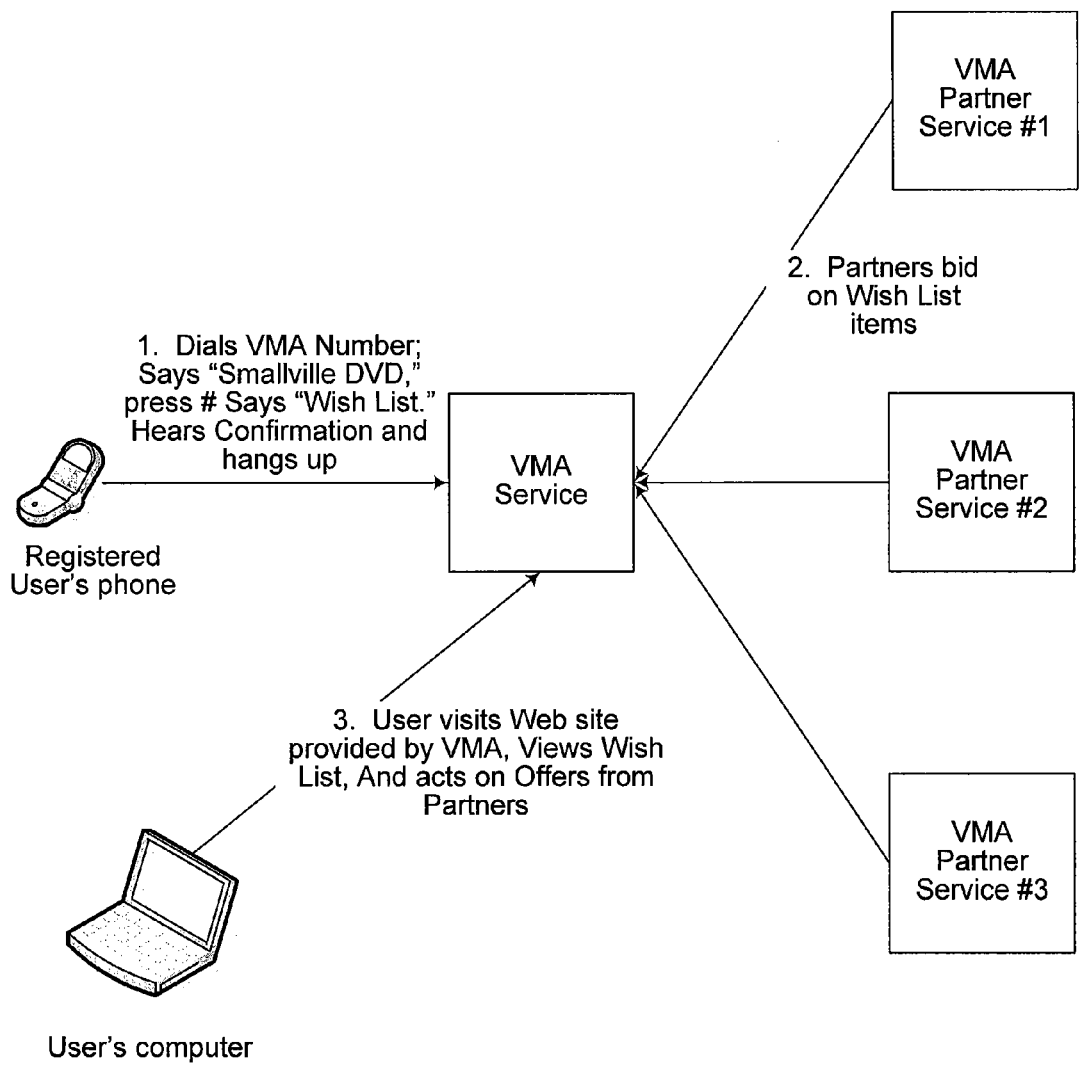

In the example scenario of FIG. 3, a caller user who places a call to an example embodiment of the VMA system is a registered VMA system user whose phone number and email address are previously specified to the VMA system. In a manner similar to that of FIG. 1, the caller user in the example scenario of FIG. 3 dials a general access phone number provided by the VMA system, and delivers a voice message by speaking one or more information items (e.g., instructions, content, etc.). However, in this example, the caller user also tags the message during the telephone call using one or more tags from a list of predefined tags (e.g., tags associated with the caller user's account and/or with specific lists or other information collections), such as by speaking one of the tags. After the VMA system recognizes the tag, it adds the one or more information items from the voice message to a specific list associated with the tag.

In particular, in the example scenario of FIG. 3, the registered caller user calls a general number provided by the VMA system. After hearing a welcome prompt, the call user says "Smallville DVD," presses the pound sign button ("#") on his/her phone, says "Wish List" (which in this example is a predefined tag associated with a wish list), and hangs up after hearing a confirmation. The VMA system records the voice message, automatically identifies the "Smallville DVD" information item from the voice message, and then adds an indication of that information item to the caller user's wish list, such as for later access by the caller user and/or another user. In this example scenario, the VMA system also shares the information item obtained from the voice message with one or more partner services (e.g., online retailers, auction sites, etc.), such as to provide information to one or more partner services. The caller user may then later visit a Web site provided by the VMA system and view the wish list, which now has new information based on the caller user's voice message (e.g., a textual representation of the "Smallville DVD" information item, related offers from partner sites, etc.).

In some embodiments, the VMA system may further share information on a caller user's wish list with a partner service, such as for that partner service to replicate the user's wish list at the partner service or to otherwise include some or all information items from the wish list on the user's wish list at the partner service. If so, the caller user may also be available to access the user's wish list information from a Web site of that partner service. Alternatively, in some embodiments, a user's wish list information may be available to the user while the user is interacting with a partner's Web site, but without the VMA system having provided the wish list information items to the partner service, such as via a wish list GUI widget provided to the partner from the VMA system (e.g., a small wish list window embedded in the partner's Web site, which retrieves data from the VMA system).

Some examples of tags provided by, and associated information items stored by an example embodiment of the VMA system are as follows:

| No. | Tag | Associated Information |
| --- | --- | --- |
| 1 | Groceries | "Milk, Butter, Eggs" |
| 2 | Wish List | "Smallville DVD" |
| 3 | Shopping List | "'The World is Flat' by Thomas Friedman" |
| 4 | Deferred Web Search | "Iceland hot springs" |
| 5 | To-Do List | "Schedule Camry 30,000 mile tune up" |
| 6 | Blog comments | "Nice pictures, talk soon" |
| 7 | Delegate Work | "Cancel my flight to NYC next week" |
| 8 | Gift List | "blender for Geoff's housewarming" |
| 9 | Travel Planning List | "buy snorkel gear for trip to Bahamas" |

Actions may be taken by an example embodiment of the VMA system for particular tags in a manner similar to that described with respect to the scenario described for FIG. 1, or in other embodiments additional or other actions may be performed.

Figure 4:
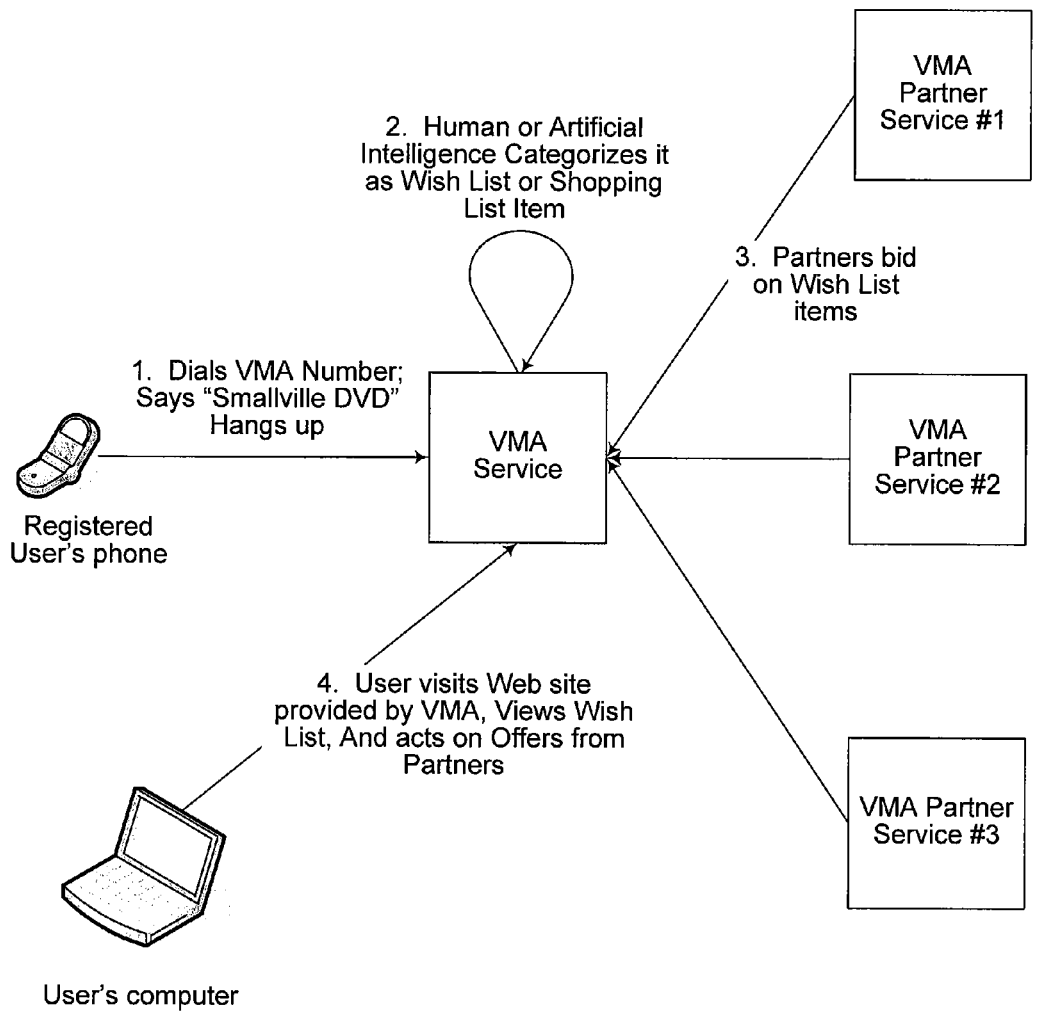

In the example scenario illustrated in FIG. 4, a caller user who places a call to an example embodiment of the VMA system is a registered VMA system user whose phone number and email address are previously specified to the VMA system. The caller user dials a general access phone number provided by the VMA system and leaves a voice message that includes one or more spoken information items. In this example, the VMA system uses implicit techniques to categorize the voice message (e.g., using human input, artificial intelligence techniques, etc.), so as to determine a specific list to which the information items should be added and/or to determine some other action to be performed regarding the information items (e.g., to provide information to users that is related to the information items, such as information associated with one or more affiliate-sponsored keywords or phrases corresponding to one or more of the information items).

In particular, in the example scenario of FIG. 4, a caller user calls a general access phone number provided by the VMA system. After hearing a welcome prompt, the caller user says "Smallville DVD," and hangs up after hearing a confirmation message. The VMA system records the voice message and analyzes it (whether manually and/or automatically) to determine an appropriate category that may be associated with the spoken information item of the voice message, such as to add an indication of the spoken information item to a wish list and/or a shopping list (e.g., based on the information item corresponding to a type of product and/or service that is appropriate for a wish list and/or shopping list, but not corresponding to one or more types that are appropriate for other types of lists). In a manner similar to the scenarios described for FIGS. 1 through 3, after the spoken information item is categorized and added to an appropriate list, additional actions may be performed in at least some embodiments, such as in this example to obtain price bids from partner services (e.g., one or more online retailers, etc.) related to the product represented by the spoken information item. The caller user may then later access the list and interact with it in various ways.

Figure 5:
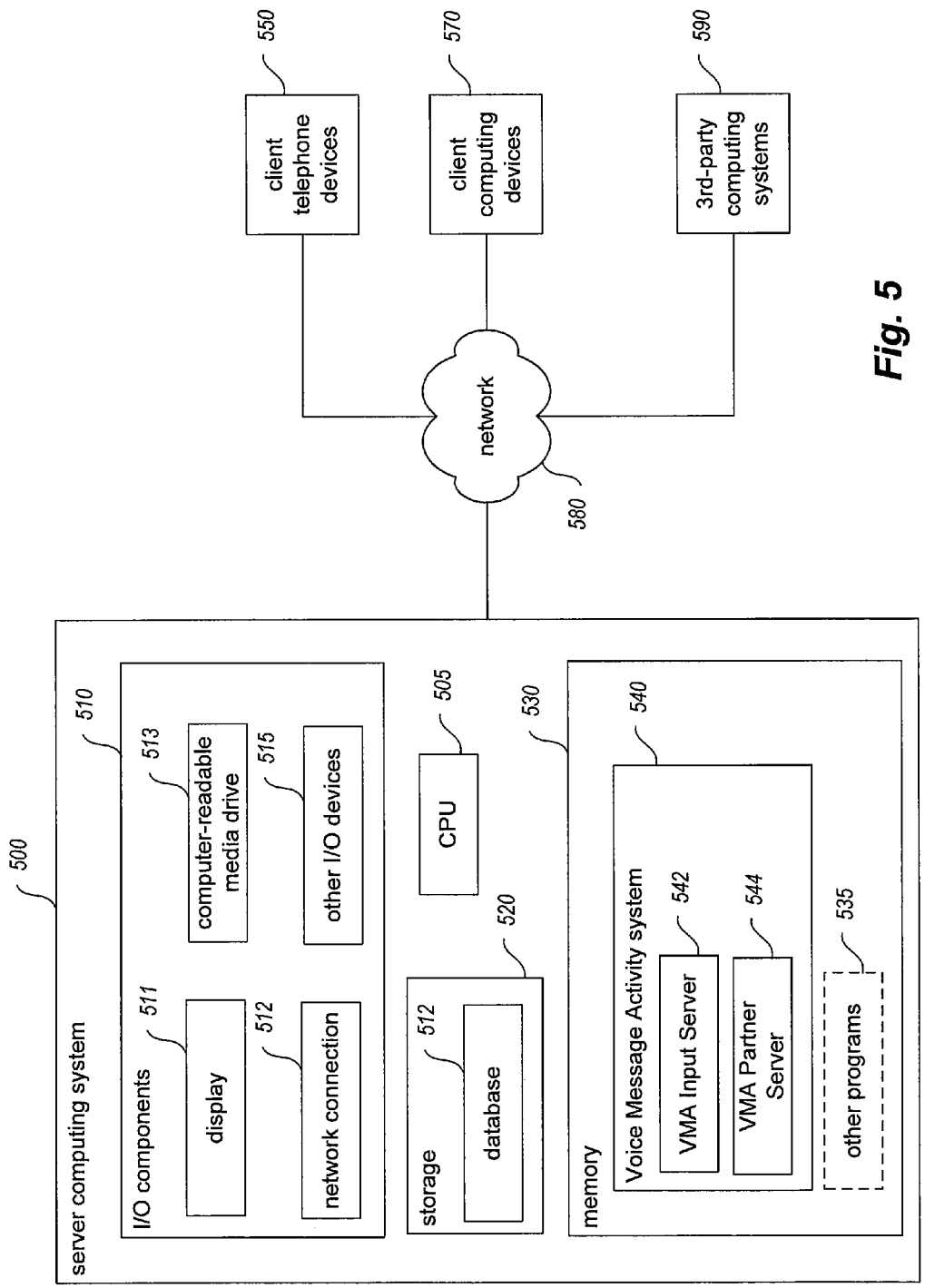
FIGS. 5 and 6A-6B are block diagrams illustrating examples of computing systems suitable for performing actions for users based on spoken information in at least some embodiments.
Figure 6A:
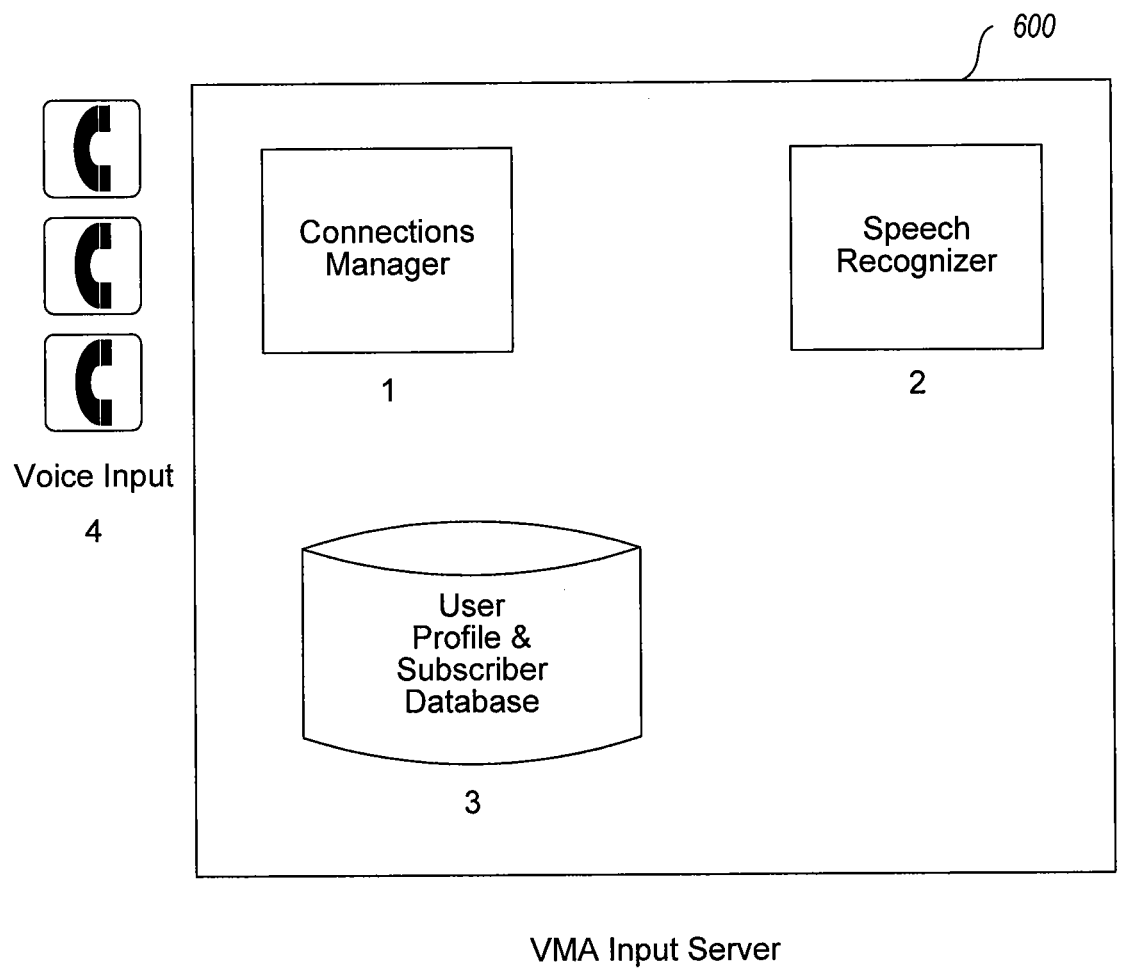
Figure 6B:
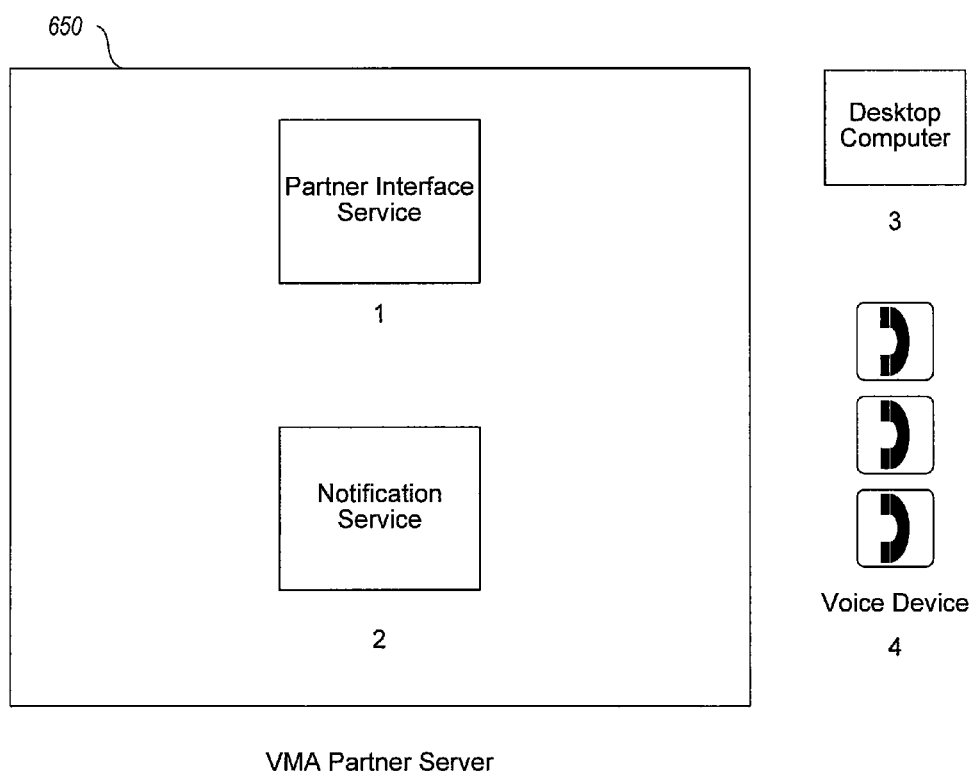

FIGS. 5 and 6A-6B are block diagrams illustrating portions of an embodiment of a VMA system. In particular, FIG. 5 illustrates a high-level overview of an embodiment of the VMA system, FIG. 6A illustrates additional details regarding an embodiment of a VMA Input Server component of the VMA system, and FIG. 6B illustrates additional details regarding an embodiment of a VMA Partner Server component of the VMA system.

FIG. 5 is a block diagram illustrating example computing systems suitable for performing techniques for performing actions for users based on spoken information in various situations. In particular, FIG. 5 illustrates a server computing system 500 suitable for executing an embodiment of the VMA system 540, as well as various client devices 550 and 570 for interacting with the VMA system, and other computing systems 590 (e.g., partner computing systems, such as online retailers). In the illustrated embodiment, the client devices include telephone-based devices 550 and computing devices 570, such as to allow users to access functionality from the VMA system and provide information to the VMA system. In some embodiments, at least some devices may have capabilities to act as both devices 550 and 570 (e.g., cell phones that have both voice-based and data-based data retrieval capabilities, computing systems that include microphones and speakers and other components to enable Internet-based or other types of telephone calls to be placed, etc.).

In addition, in this example embodiment, the server computing system 500 has components that include a CPU 505, storage 520, memory 530, and various I/O components 510, including a display 511, a network connection 512, a computer-readable media drive 513, and other I/O devices 515 (e.g., ports or other connections for one or more incoming telephone lines, a microphone, a speaker, a mouse, keyboard, etc.). The storage 520 includes a database 525 to store various information, such as information about registered users, information about various partner services, various voice messages (e.g., temporarily until they are analyzed), collections of information (e.g., wish lists, shopping lists, custom collections, etc.) for users, various information associated with the information collections (e.g., related information supplied by partners or others), etc. Furthermore, in some embodiments, various specialized hardware and/or software components may be included, such as to perform automated speech-to-text and/or text-to-speech conversion. The other devices and systems 550, 570 and 590 each may include similar components to those of the server computing system, but are not illustrated in detail here. Similarly, while not illustrated in FIGS. 6A and 6B, the VMA Input Server component and VMA Partner Server component may each be provided by one or more distinct computing systems (or by a single computing system that provides both), and each such computing system may similarly include various such components.

As noted, an embodiment of a VMA system 540 is executing in memory 530, so as to interact with the client devices 550 and 570 over one or more networks 580 (e.g., one or more landline telephone networks, one or more cellular telephone networks, the Internet, etc.) using the network connection 512. In the illustrated embodiment, the VMA system 540 includes a VMA Input Server component 542 and a VMA Partner Server component 544, as described in greater detail with respect to FIGS. 6A and 6B. In addition, one or more other programs 535 may optionally be present and executing in memory 530, such as to provide other related functionality (e.g., to register new users, to provide functionality for partner providers and other entities, etc.). In this embodiment, the VMA system is implemented in part or in whole in software, such as via one or more software components with executable software instructions that are stored in memory 530 of the server 500 for execution and/or on storage 520 of the server 500.

FIG. 6A illustrates additional details with respect to one example embodiment of a VMA Input Server component 542, which has several subcomponents in the example embodiment, as follows:

A Connections Manager component 1, which manages voice connections from external voice sources to the VMA Input Server, including voice input 4 from calls from users (e.g., via landline phone devices, mobile phone devices, other desktop voice input devices, etc.). The Connections Manager may accept connections in various ways, such as by using standard SS7 (Signaling System 7) signaling and/or Voice over Internet Protocol (using Session Initiation Protocol and similar other technologies), maintains voice calls until the users have completed their interactions, and also obtains and stores caller identification information in at least some embodiments.

A Speech Recognizer component 2, which accepts user voice-based spoken input and converts it into text, such as via automated speech-to-text translation and/or by using human transcriptions. In at least some embodiments, it converts speech into text in a substantially immediate manner (e.g., within a second) or may instead take longer (e.g., a few minutes, hours or days). The Speech Recognizer component 2 may also provide responses back to a caller user through the Connections Manager component 1 in some embodiments, such as to interactively provide information to the user.

A User Profile and Subscriber Database component 3, which contains details of registered users of the VMA system in the illustrated embodiment, such as to store a registered user's email addresses, phone numbers, instant messaging addresses, phone providers and preferences. Various other types of user-specific information may similarly be stored and used in other embodiments, and in some embodiments at least some information collections may also be stored in the database.

FIG. 6B illustrates additional details with respect to one example embodiment of a VMA Partner Server component 544, which has several subcomponents in the example embodiment, as follows:

A Partner Interface Service component 1 that handles interactions between the VMA system and one or more partner systems (e.g., online retailers, news and content sites, Web search engines, etc.). In some embodiments, interactions include providing information to one or more partners, such as information obtained from caller users of the VMA system, etc. In other embodiments, one or more partners may use the Partner Interface Service to provide information to the VMA system, such as notifications to provide to VMA system users, etc.

A Notification Service component 2 for sending various types of notifications and/or other information to VMA system users via various communication mechanisms, such as by initiating notifications or other communications that are sent to users by email, SMS text messages, instant messages, phone messages, etc. In some embodiments, various notifications and/or other information may be available to users that request the information from desktop computers 3 (e.g., via a Web browser, etc.) and/or voice devices 4 (e.g., landline phone devices, mobile phone devices, desktop voice input devices, etc.), whether instead of or in addition to communications initiated by the VMA system.

One or more client computing devices 3, such as desktop computers, for use by users in accessing information from the VMA system via a data network. For example, client device 3 may be a standard desktop computer executing any operating system and appropriate application (e.g., a Web browser, an email application, etc.), and optionally may include a voice interface and/or may execute one or more instant messaging clients.

One or more client voice devices 4 for use by users in accessing information from the VMA system over a network (e.g., a phone network). For example, a client voice device may be a landline phone, a mobile phone, or other desktop voice input device (e.g., such as provided by client data devices 3) that can receive voice signaling and content, and optionally text messages.

It will be appreciated that the illustrated computing systems and devices 500, 550, 570 and 590 are merely illustrative and are not intended to limit the scope of the present invention. The computing systems and devices may be connected to other devices that are not illustrated, including through one or more networks. More generally, a "client" or "server" system or device may comprise any combination of hardware or software that can interact and perform the described types of functionality, including without limitation desktop or other computers, database servers, network storage devices and other network devices, PDAs, cellphones, wireless phones, pagers, electronic organizers, Internet appliances, television-based systems (e.g., using set-top boxes and/or personal/digital video recorders), and various other consumer products that include appropriate inter-communication capabilities. In addition, the functionality provided by the illustrated VMA system may in some embodiments be distributed in more or less components than shown, and in some embodiments more or less functionality than is illustrated may be provided.

In addition, while various items may be stored in memory or on storage while being used, these items or portions of them may be transferred between memory and other storage devices for purposes of memory management and/or data integrity. Alternatively, in other embodiments some or all of the software components may execute in memory on other devices or systems and communicate with the computing system(s) via inter-computer communication. Furthermore, in some embodiments, some or all of the system components may be implemented or provided in other manners, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the system components or data structures may also be stored (e.g., as software instructions or structured data) on a computer-readable medium, such as a hard disk, a memory, a network, or a portable media article to be read by an appropriate drive or via an appropriate connection. The system components and data structures may also be transmitted and/or stored as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 8:
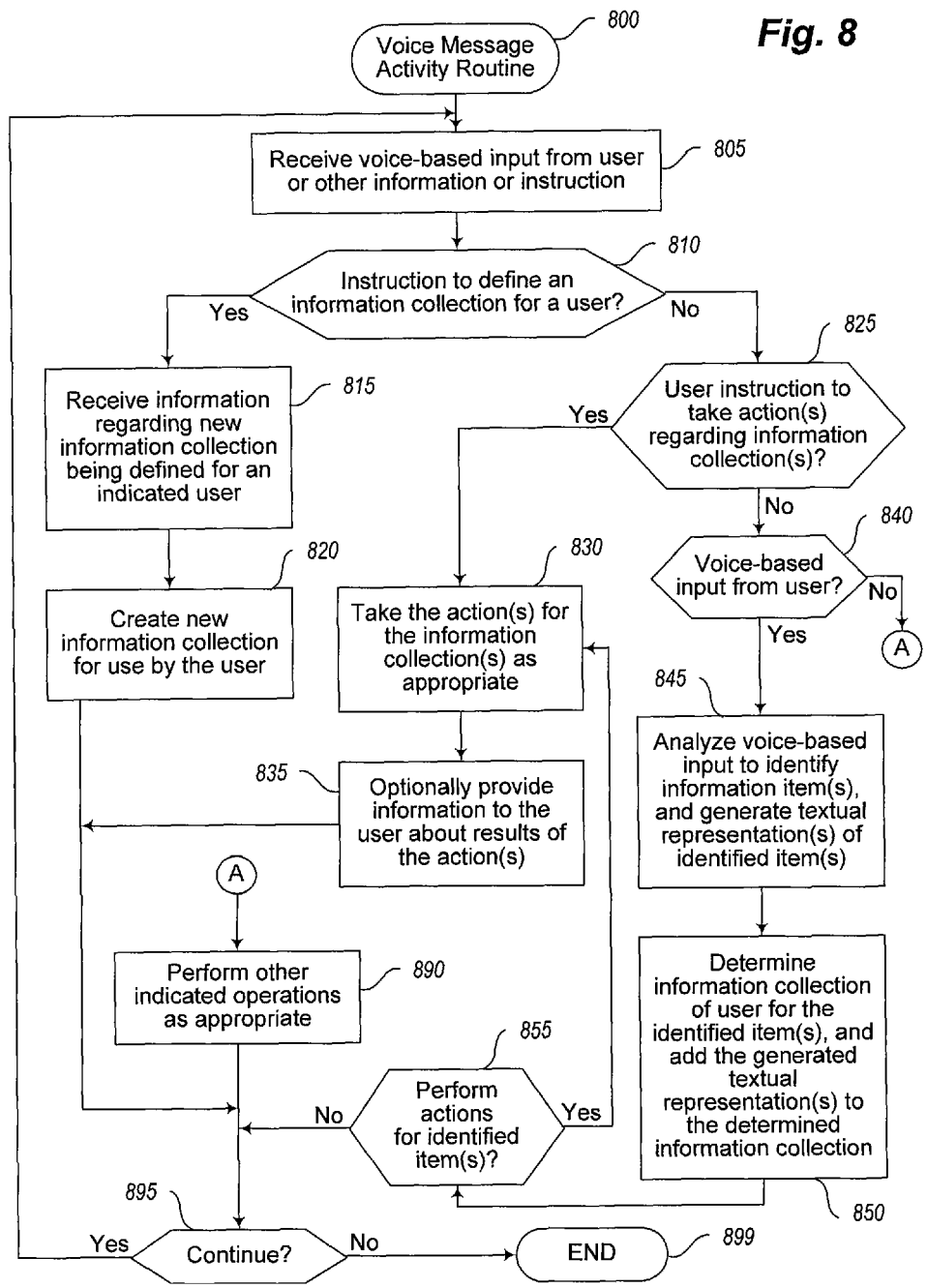
FIG. 8 is a flow diagram of an example embodiment of a Voice Message Activity routine.

FIG. 8 illustrates a flow diagram of an example embodiment of a Voice Message Activity routine 800. The routine may be provided by, for example, execution of an embodiment of the VMA system 540 of FIG. 5, and/or as described elsewhere, such as to perform various actions for users based on spoken information provided by the users.

The routine begins at step 805, where an indication is received of input to the routine (e.g., voice-based spoken input from a user during a telephone call) or of another type of information or instruction. While not illustrated here, in some embodiments, if information or an instruction is received from a user, the routine may further attempt to identify whether the user is a registered user, or to otherwise gather information from the user related to performing actions for the user.

After step 805, the routine continues to step 810 to determine whether an instruction was received to define a new information collection for a user, and if so continues to step 815 to receive information regarding the new information collection being defined for an indicated user. For example, information regarding a new information collection being defined for an indicated user may include a name of the information collection, one or more keywords and/or tags associated with the information collection, one or more types of actions to take when new information items are added to the information collection and/or in other indicated situations, one or more information items as contents for the new information collection, restrictions and/or characteristics of the information collection (e.g., user access restrictions, size limitations, etc.), etc. The routine then continues to step 820 to create the new information collection for future use by the indicated user and/or others (e.g., for use in steps 830, 845 and 850 discussed below), such as by storing information about the new information collection in a manner associated with the indicated user. In some embodiments, information received at step 815 may be provided by the indicated user and/or by another party on behalf of the indicated user (e.g., such as a provider of the VMA system, a partner service, other users, etc.). In addition, in some embodiments, at least some of the received information may be voice-based information, and if so, the voice-based information may be analyzed for instructions and/or other information items regarding the new information collection. In some embodiments, at least some of the received information may be in forms other than voice-based, such as text-based or other types of input (e.g., from a user interacting with an interface to indicate information regarding a new information collection, such as via an interactive Web site-based user interface or a programmatic interface, etc.). In addition, while not illustrated here, in some embodiments a user may similarly specify various information for one or more predefined lists or other information collections (e.g., predefined information collections provided by the VMA system), such as one or more keywords and/or tags to be associated with the predefined information collection, one or more types of actions to take when new information items are added to the predefined information collection and/or in other indicated situations, etc.

If it was instead determined in step 810 that an instruction to define an information collection for a user is not received, the routine continues instead to step 825 to determine if a user has provided an instruction to take one or more actions regarding one or more information collections. While not illustrated here, in some embodiments, a party other than the user may similarly provide an instruction to take one or more actions regarding one or more information collections on behalf of a user. If it is determined in step 825 that an instruction is provided to take one or more actions regarding one or more information collections, the routine continues to step 830 to perform the appropriate action(s) for the information collection(s). In some embodiments, one or more actions to be taken for an information collection may further be determined in other manners, whether instead of or in addition to instructions provided by a user, such as on the basis of the type of information collection, the type of information items contained in the collection, and/or other criteria. After step 830, the routine proceeds to step 835 to optionally provide information to the user about results of the one or more performed actions (e.g., to send a user email, SMS, instant message, etc.

containing information related to results of a Web search, price bids for products from partners, confirmation messages, etc.).

If it was instead determined in step 825 that an instruction to take one or more actions regarding one or more information collections is not provided, the routine continues to step 840 to determine if voice-based spoken input is received from a user (e.g., a voice message), and if so then continues to step 845 to analyze the voice-based input to identify one or more information items (e.g., keywords, keyphrases, tags, other words or phrases associated with content to be added to one or more information collections, etc.), and to generate textual representations for any identified information items. In step 850, the routine then determines an information collection of the user to which the identified items correspond, and adds the generated textual representations to the determined information collection. Various techniques may be used to determine an information collection of the user, such as by the use of a particular phone number associated with a particular information collection by the user, by detecting one or more keywords/phrases associated with a particular information collection spoken at the beginning or end of a voice message, by other indications from the user (e.g., such as responses to an IVR, etc.), etc. After step 850, the routine continues to step 855 to determine if one or more actions should be performed for the one or more identified items at the current time, such as based on instructions indicated by the user in the voice-based input or otherwise provided along with the information items, based on previously specified instructions that are associated with the information collection, etc. If so, the routine continues to step 830 to perform any appropriate other actions.

If it was instead determined in step 840 that voice-based input from a user was not received, the routine continues to step 890 to perform one or more other indicated operations as appropriate. Such operations may include, for example, one or more of the following: registering users of the VMA system; modifying an existing information collection; providing access to users and/or entities about prior interactions with the VMA system; performing a periodic or other analysis of information items included on one or more information collections of one or more users, such as for data mining purposes; providing voice-based interaction with an instant message service on behalf a user, as discussed in greater detail elsewhere; sending voice-based email on behalf of a user; etc.). After steps 820, 835, or 890, or if it was determined in step 855 not to perform actions for one or more identified items, the. routine continues to step 895 to determine whether to continue. If so, the routine returns to step 805, and if not continues to step 899 and ends.

Figure 7:
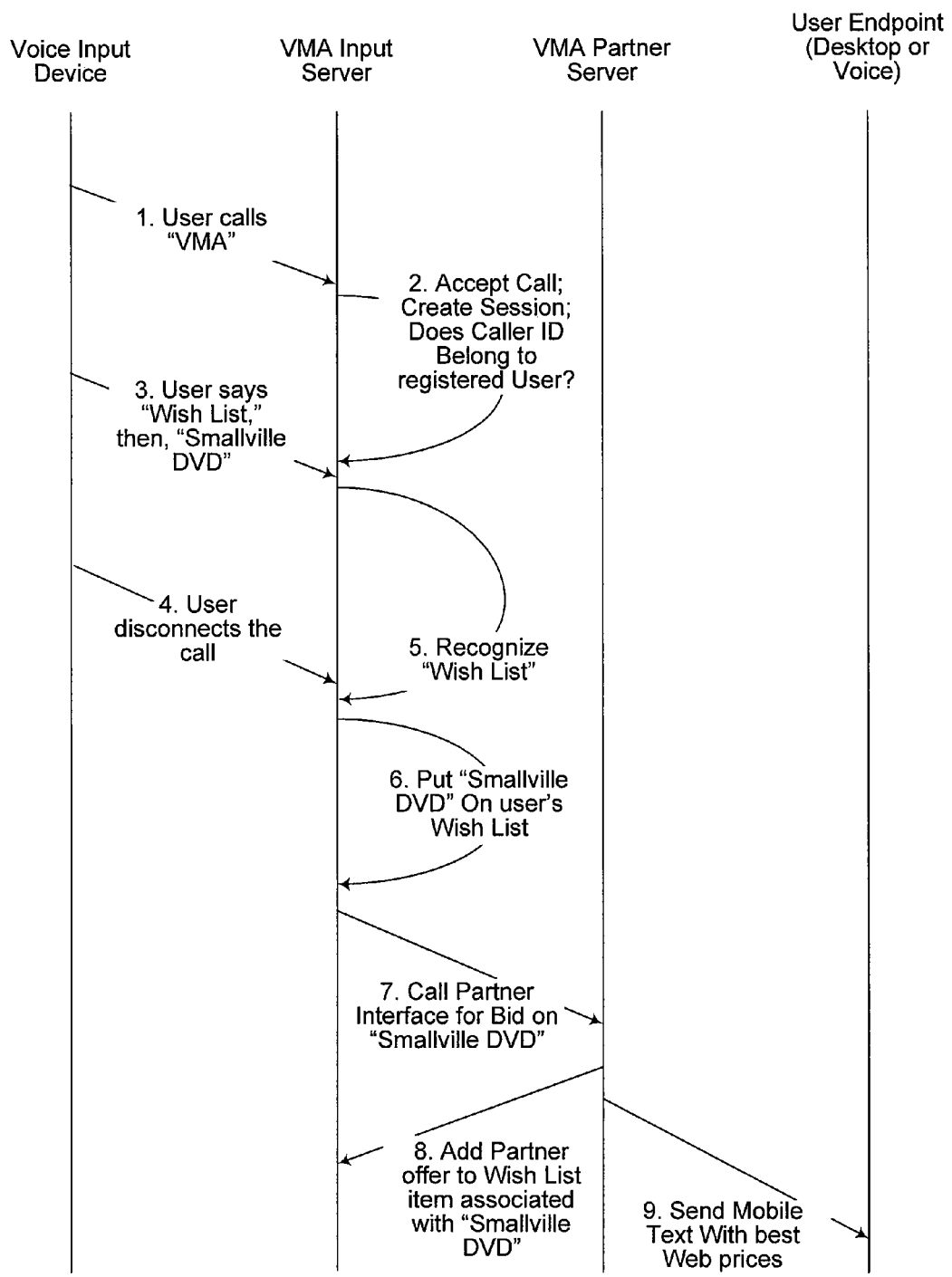
FIG. 7 illustrates examples of some types of data that may be exchanged when performing actions for users based on spoken information.

FIG. 7 illustrates an example of information flow that may occur in some embodiments, and in particular corresponds to the example scenario of FIG. 1. In this example, the flow is as follows:

1. A user contacts the VMA system, such as by calling an appropriate telephone number.
2. The VMA Input Server accepts the call and creates a corresponding session. It also checks if the caller ID maps to a registered user. If it does, as in this case, it associates the session with this information.
3. The user says the expression "Wish List" and then says the expression "Smallville DVD".
4. After hearing an indication of confirmation from the VMA Input Server, the user disconnects the connection (e.g., by hanging up the telephone, etc.).
5. The VMA Input Server recognizes the keyword expression "Wish List" for use in categorizing the following information item.
6. The VMA Input Server transcribes the expression "Smallville DVD" and adds a textual representation of it as an item to the user's wish list.
7. The VMA Input Server interacts with the VMA Partner Server to determine if any partners have bids for a Smallville DVD.
8. The VMA Partner Server provides any bid information obtained from partners for the Smallville DVD to the VMA Input Server. The VMA Input Server saves this information and associates it with the "Smallville DVD" information item added to the wish list.
9. The VMA Partner Server sends a SMS text message to the user's mobile phone and/or any other device registered for receiving notifications from the VMA system, such as to indicate the best price among the bids and/or other information about the bid(s).

Those skilled in the art will also appreciate that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited by the exemplary details. In addition, while certain aspects of the invention may be now or later presented in certain claim forms, the inventors contemplate the various aspects of the invention in any available claim form. For example, while only some aspects of the invention may be initially recited as being embodied in a computer-readable medium, other aspects may likewise be so embodied.

What is claimed is:

1. A computer-implemented method to allow sellers to provide pricing information to a user based on a stored collection of item information associated with the user, the method comprising:
item information for a user, wherein each of the collections of item information has an associated topic and includes a plurality of purchasable items;
determining whether the user has elected to make at least one of the collections of item information available to affiliated sellers;
when the user has elected to make a collection of item information available to affiliated sellers:
allowing affiliated sellers to access information about purchasable items in the collection of item information associated with the user;

receiving pricing information associated with accessed information about purchasable items from the affiliated sellers, the pricing information comprising an offer to supply a purchasable item at a particular price;

providing to the user at least some of the received pricing information for purchasable items in the collection of item information;

receiving, from the user, a selection of an affiliated seller from which to purchase a selected item; and transmitting the purchase selection to the affiliated seller selected by the user to allow the affiliated seller to fulfill the purchase selection.

2. The method of claim 1, further comprising maintaining collections of item information for multiple users.

3. The method of claim 1, wherein the purchasable items in the collection of item information include products and services.

4. The method of claim 1, wherein the collections of item information include at least one of a shopping list of products and/or services for planned purchase for the user, a wish list of products and/or services that are desired by the user, or a gift list of products and/or services for possible purchase by the user for one or more recipients.

5. The method of claim 1, further comprising withholding personal information relating to the user from an affiliated seller when the affiliated seller accesses a collection of item information associated with the user.

6. The method of claim 1, further comprising providing characteristics of the user to an affiliated seller to allow the affiliated seller to tailor the pricing information to the characteristics of the user.

7. The method of claim 1, wherein the pricing information further includes promotional information applicable to a purchasable item or information about a related purchasable item.

8. The method of claim 7, wherein promotional information applicable to a purchasable item includes a discount, a coupon, or a free sample.

9. The method of claim 1, further comprising charging an affiliated seller a flat fee, a fee for each time the seller accesses information about purchasable items associated with the user, a fee for each time pricing information is received from the seller, or a fee for each time the pricing information is provided to the user.

10. The method of claim 1, further comprising, before allowing an affiliated seller to access items in a collection of item information associated with the user, determining that the affiliated seller has authority to access the user's collection of item information.

11. A computer-implemented method to allow partner services to provide pricing information to a user based on a group of information maintained for the user, the method comprising:

storing one or more groups of information for a user, wherein each group of information is associated with a distinct topic and includes multiple information items;

verifying that the user has granted one or more partner services access to a group of information associated with the user;

for each partner service that is has been granted access to the group of information:

allowing the partner service to access the information items in the group of information associated with the user; and receiving, from the partner service, pricing information associated with at least one of the accessed information items;

providing to the user at least some of the received pricing information from the partner services granted access;

receiving, from the user, a selection of a partner service from which to purchase an information item; and transmitting the purchase selection to the selected partner service to allow the partner service to fulfill the purchase selection.

12. The method of claim 11, wherein storing one or more groups of information for a user comprises:

analyzing voice input spoken by a user during a telephone call to identify one or more information items;

analyzing voice input spoken by the user during the telephone call to identify a distinct topic associated with the identified information items; and storing the identified one or more information items in association with the identified distinct topic.

13. The method of claim 11, wherein storing one or more groups of information for a user comprises:

maintaining a plurality of predefined distinct topics; and receiving an indication from the user of a selected distinct topic from the plurality of predefined distinct topics.

14. The method of claim 11, wherein at least one of the stored groups of information is further configured to be shared between multiple users.

15. The method of claim 11, further comprising collecting a fee from the partner services for providing pricing information to the user.

16. A tangible computer-readable storage device containing instructions that, when executed by a computing system, cause the computing system to perform a method to allow sellers to provide price bids to a user for items in a list maintained by the user, the method comprising:

maintaining one or more lists for a user, wherein each of the lists is specific to an associated topic and includes multiple items;

determining that the user has elected to make one or more of the lists available to an affiliated seller;

allowing the affiliated seller to access the items in a list associated with the user;

receiving, from the affiliated seller, pricing information associated with at least one of the accessed items;

providing to the user at least some of the received pricing information;

receiving, from the user, a selection of an item to purchase from the affiliated seller; and transmitting the purchase selection to the affiliated seller to allow the affiliated seller to fulfill the purchase selection.

17. The computer-readable storage medium of claim 15, wherein the affiliated sellers access the items in a list and provide pricing information through an application programming interface (API).

18. The computer-readable storage medium of claim 16, wherein providing to the user at least some of the received pricing information includes sending one or more Short Message Service (SMS) messages to the user.

19. The computer-readable storage medium of claim 16, further comprising charging the affiliated sellers a fee for providing the pricing information to the user.

20. The computer-readable storage medium of claim 16, further comprising collecting a fee from the user for providing pricing information to the user.

* * * * *